3,409,414
EXTRACTION OF BERKELIUM VALUES IN THE TETRAVALENT STATE USING 2-THENOYLTRIFLUOROACETONE
Fletcher L. Moore, Knoxville, Tenn., assignor to the United States of America as represented by the United States Atomic Energy Commission
Filed Oct. 6, 1967, Ser. No. 674,067
8 Claims. (Cl. 23—339)

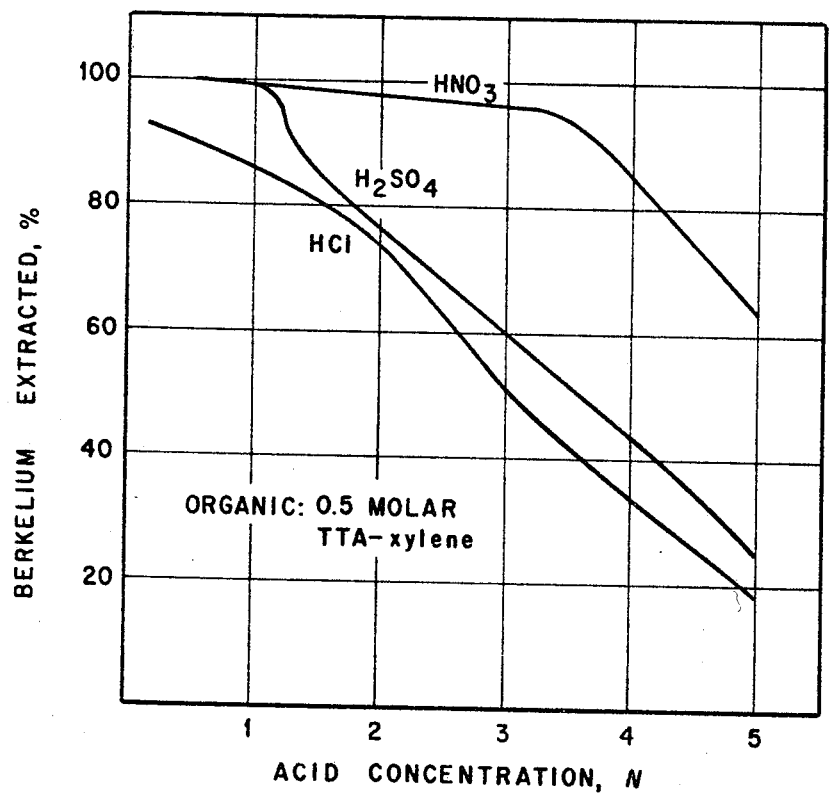

ABSTRACT OF THE DISCLOSURE

A method of selectively removing berkelium values from an aqueous solution containing said values comprising reducing the pH of the solution to a value less than 2, oxidizing the berkelium to the tetravalent oxidation state, and extracting the resulting berkelium values with an organic solution of 2-thenoyltrifluoroacetone.

BACKGROUND OF THE INVENTION

This invention was made in the course of, or under, a contract with the United States Atomic Energy Commission.

My invention relates to methods of removing berkelium values from aqueous solutions and of separating berkelium values from other metal values.

Berkelium can be separated from other metal values by ion exchange and liquid-liquid extraction methods. However, the known processes for effecting this separation have the disadvantages of being laborious and time consuming, and in some cases the degree of separation has been poor. For instance, an organic solution of 2-thenoyltrifluoroacetone (TTA) has been used to extract trivalent berkelium from aqueous solutions having a pH greater than 2. However, under these conditions other actinide elements, lanthanide elements, zirconium, niobium, ruthenium, tin, cobalt, iron, copper, aluminum, bismuth, polonium, nickel, beryllium and vanadium are also extracted in significant concentrations.

SUMMARY OF THE INVENTION

It is accordingly one object of my invention to provide an improved method of removing berkelium from an aqueous solution containing said values.

It is another object to provide an improved method of separating berkelium from other metal values.

Other objects of my invention will be apparent from the following description and claims.

In accordance with my invention I have provided a method of removing berkelium values from an aqueous solution containing said values comprising the steps of oxidizing berkelium to the tetravalent oxidation state, adjusting the pH of said solution to a value less than 2, and contacting the resulting acidic solution with an organic solution of 2-thenoyltrifluoroacetone.

My method extracts berkelium essentially quantitatively and selectively. Excellent separation of berkelium is effected from many elements including the alkali metals, alkaline earth metals, trivalent lanthanides, ruthenium, zirconium, niobium, uranium, neptunium, plutonium, americium, curium, californium, iron, nickel, aluminum, and silver.

BRIEF DESCRIPTION OF THE DRAWING

The figure shows the berkelium extraction capabilities of an organic solution of 2-thenoyltrifluoroacetone from nitric acid sulfuric acid, and hydrochloric acid solutions as a function of the acid concentration.

DESCRIPTION OF THE PREFERRED EMBODIMENTS

In carrying out my invention an acidic aqueous solution containing tetravalent berkelium is contacted with an organic solution of 2-thenoyltrifluoroacetone.

The pH of the aqueous phase must be below 2, and the preferred acid concentration depends on the specific anions present. As can be seen in the figure, berkelium can be extracted essentially quantitatively from aqueous solutions containing nitric acid (0.5 to 3.5 normal), sulfuric acid (0.5 to 1.0 normal), and extracts well from low concentrations (0.01 to 0.1 normal) of hydrochloric acid. Mixtures of acids may be used and a mixture of nitric acid and sulfuric acid is especially effective in achieving essentially quantitative extraction of berkelium with high separaton factors. A typcal useful mixture of these acids is one which produces a solution 1 normal in nitric acid and 0.5 normal in sulfuric acid. In order to extract berkelium, fluoride ions must be removed to less than 0.02 normal, or effectively complexed as by aluminum ions or boric acid.

The berkelium must be oxidized to the tetravalent oxidation state. Typically useful oxidants are ammonium peroxydisulfate, silver-catalyzed ammonium peroxydisulfate, argentic oxide, potassium bromate, sodium bromate, and potassium permanganate. Sodium dichromate is the preferred oxidant. Although marco amounts of cerium (concentrations greater than 40 micrograms per milliliter) drastically inhibit the oxidation of trivalent berkelium, I have discovered that a mixture of sodium dichromate and sodium bromate is unexpectedly useful in oxidizing bereklium when cerium is present.

The concentration of oxidant must be high enough so that an excess is always present to maintain berkelium in the tetravalent oxidation state. The preferred concentration depends to some extent upon the oxidane used, but typically will be in the range of 0.1 to 0.6 milar.

The oxidation of trivalent berkelium in dilute nitric, sulfuric, or hydrochloric acid occurs almost instantaneously at room temperature. If separation of berkelium from neptunium and plutonium is desired, the oxidation step should be carried out in the absence of sulfuric acid to ensure that the neptunium and plutonium are in the inextractable sexivalent oxidation states. Sulfuric acid strongly inhibits the oxidation of these elements, and should be added after the oxidation and prior to the extraction step.

Considering the organic phase, the extractant, 2-thenoyltrifluoroacetone, is dissolved in an organic solvent. The specific organic compound selected as the solvent is not critical and may be either aliphatic or aromatic, and may contain substituents or be unsubstituted; however, those organic compounds which reduce the oxidizing agent excessively, such as ketones and alcohols, should be avoided. Typical examples of useful solvents are xylene, diethylbenzene, heptane, chloroform, methylene chloride, nitrobenzene, nitromethane, and nitroethane.

The concentration of 2-thenoyltrifluoroacetone in the solvent is not critical since it exracts berkelium over a wide range of concentrations. Economic considerations will normally dictate that the concentration be in the range of 0.01 to 0.5 molar.

The berkelium-loaded organic phase is separated from the aqueous phase. Although a step of contacting the separated organic phase with an aqueous scrubbing solution is not essential, it may be desirable in order to increase the decontamination factor. While pure water may be used as a scrubbing solution, the scrubbing solution preferably contains an oxidant such as sodium dichromate. The presence of an oxidant is essential in a scrubbing solution containing either sulfuric or nitric acid in order to prevent excessive berkelium losses to the scrub solution.

If the extraction is carried out for analytical purposes, the organic phase can be evaporated and the berkelium determined by alpha counting. If an aqueous solution containing berkelium is desired, the berkelium can be stripped from the organic phase with an aqueous solution containing concentrated nitric, hydrochloric, sulfuric, or dilute hydrofluoric acids, or reducing agents, or a combination of an acid and a reducing agent.

Having thus described my invention the following example is offered to illustrate it in more detail.

*Example*

An aqueous solution 1 normal in nitric acid, 0.2 molar in sodium dichromate, and containing the metal ions listed in the table below, together with tracer quantities of berkelium, was heated in a 90° C. water bath for 15 minutes. The resulting oxidized mixture was cooled to room temperature, made 0.5 normal in sulfuric acid, and 5 milliliters of the resulting solution was contacted with an equal volume of a 0.5-molar 2-thenoyltrifluoroacetone-xylene solution. After mixing for 10 minutes the solutions were centrifuged to separate the organic and aqueous phases. The organic phase was washed with 5 milliliters of a 1 normal sulfuric acid-0.2 normal sodium dichromate solution. Analyses were made of the amounts of the elements present in the organic phase and compared with the amounts present in the aqueous feed solution. The amount of berkelium in the organic phase was 98.8 percent of the amount in the feed. The decontamination factors (the total amount of element in the feed solution divided by the total amount in the organic phase) for the other elements present are given in the following table.

| Element: | Decontamination factor |
|---|---|
| $^{137}$Cesium | $>2.8 \times 10^5$ |
| $^{85}$Strontium | $>2.0 \times 10^5$ |
| $^{106}$Ruthenium | $2.7 \times 10^2$ |
| $^{95}$Zirconium-Niobium | $3.4$ |
| $^{152-4}$Europium | $>2.5 \times 10^5$ |
| $^{233}$Uranium | $2.6 \times 10^4$ |
| $^{237}$Neptunium | $1.84 \times 10^3$ |
| $^{239}$Plutonium | $1.7 \times 10^3$ |
| $^{241}$Americium | $>2.4 \times 10^5$ |
| $^{244}$Curium | $>8.6 \times 10^5$ |
| $^{252}$Californium | $>6.8 \times 10^4$ |
| $^{59}$Iron | $8.8$ |
| $^{110}$Silver | $8.0 \times 10^3$ |
| Nickel | $>1.3 \times 10^3$ |
| Aluminum | $1.1 \times 10^4$ |

The berkelium was stripped by contacting the organic solution with a 10-normal solution of nitric acid. This stripping step increased the decontamination from zirconium-niobium, ruthenium, and iron to factors of $4.5 \times 10^2$, $1.4 \times 10^3$, and $1.3 \times 10^2$, respectively.

The above example is intended to illustrate, and not to limit, my invention. It is obvious that changes may be made in both the organic and aqueous phases and in the methods of contacting and separating the liquids without departing from my invention.

I claim:
1. A method of removing berkelium values from an aqueous solution containing said values and fluoride ions in an effective concentration between zero and 0.02 normal comprising:
   (a) oxidizing berkelium to the tetravalent oxidation state;
   (b) adjusting the pH of the aqueous solution to a value less than 2; and
   (c) contacting the resulting solution with an organic solution of 2-thenoyltrifluoroacetone, thereby extracting berkelium values into said organic solution.
2. The method of claim 1 wherein the aqueous solution contains nitric acid in a concentration of 0.5 to 3.5 normal.
3. The method of claim 1 wherein the aqueous solution contains sulfuric acid in a concentration of 0.5 to 1.0 normal.
4. The method of claim 1 wherein the aqueous solution contains nitric acid in a concentration of 1 normal and sulfuric acid in a concentration of 0.5 normal.
5. The method of claim 1 wherein the aqueous solution contains hydrochloric acid in a concentration of 0.01 to 0.1 normal.
6. The method of claim 1 wherein the organic solution containing berkelium values is scrubbed with an aqueous solution containing an oxidant for berkelium and sulfuric or nitric acid.
7. The method of claim 1 wherein berkelium is removed from the organic solution by contacting it with a concentrated aqueous solution of nitric, sulfuric, hydrochloric, or dilute hydrofluoric acid.
8. The method of claim 1 wherein berkelium is oxidized to the tetravalent state with a stoichiometric excess of a mixture of sodium dichromate and sodium bromate.

References Cited

Chelation of the +3 Ions of elements 95 through 100, with thenoyltrifluoroacetone, L. B. Magnuson, M. L. Anderson, Jacs., vol. 76, p. 6207, 1954.

Methods of Production and Research on Transcurium Elements, S. G. Thompson, M. L. Muga, 2nd. U.N. International Conference on the Peaceful Uses of Atomic Energy, vol. 28, p. 331, 1958.

CARL D. QUARFORTH, *Primary Examiner.*

M. J. McGREAL, *Assistant Examiner.*